Figure 2:
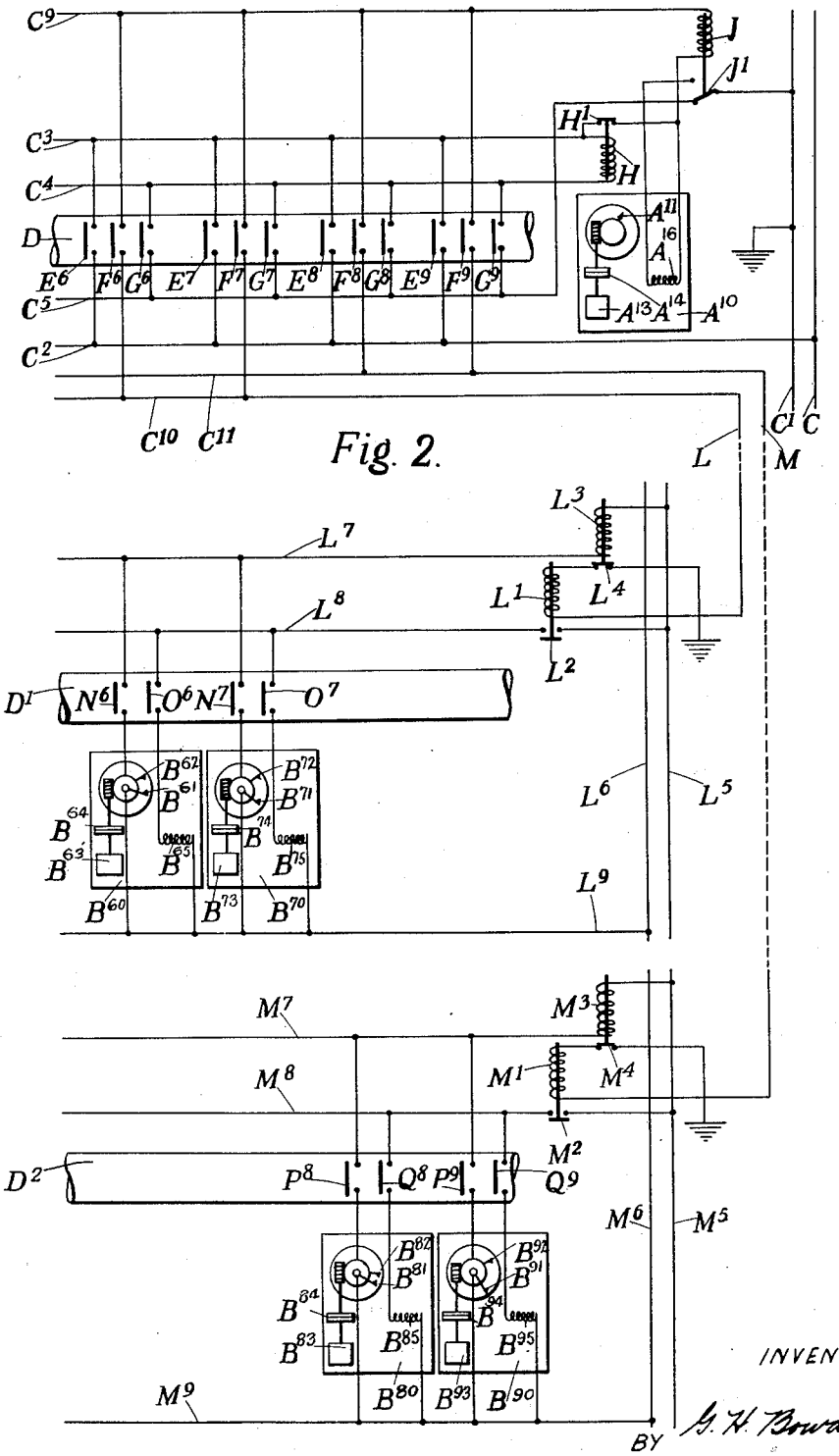

Dec. 12, 1933.  G. H. BOWDEN  1,939,486
APPARATUS FOR SUMMATING THE INTEGRATIONS OF ANY
NUMBER OF INTEGRATING QUANTITY METERS
Filed June 6, 1930   3 Sheets-Sheet 1
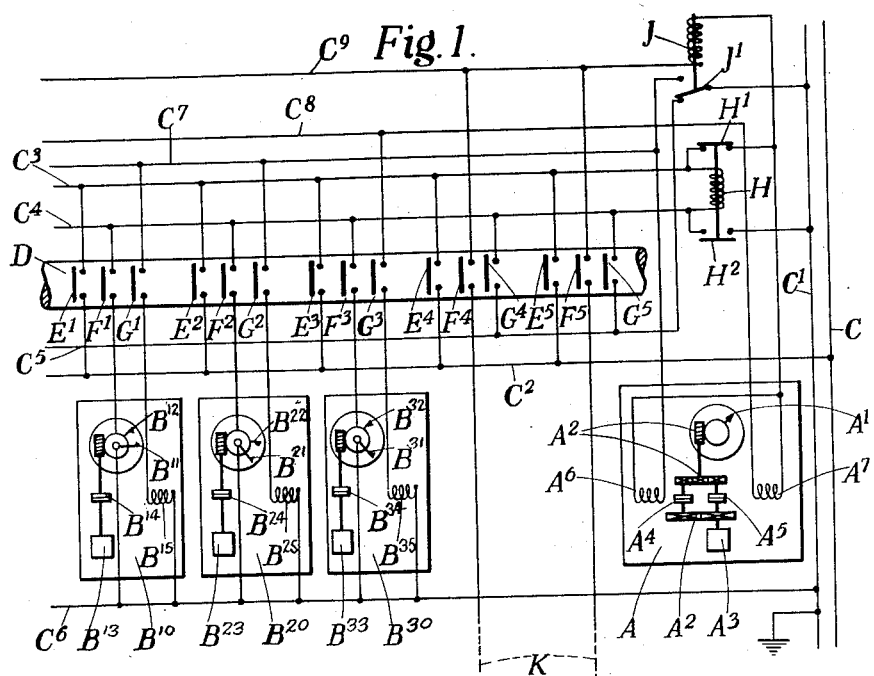
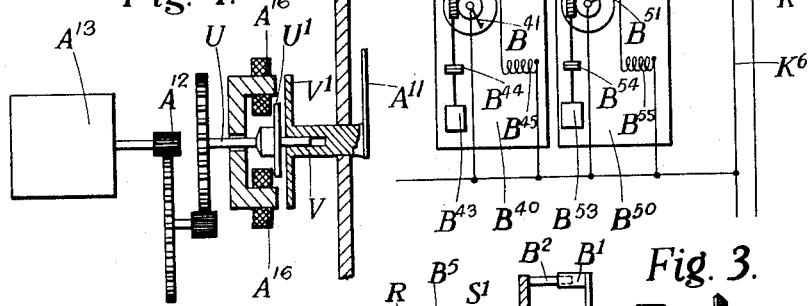
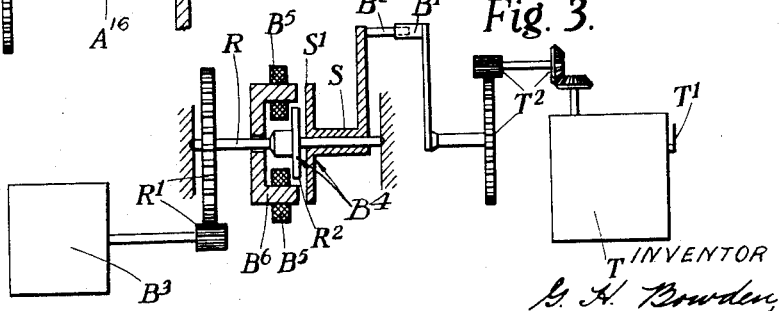
INVENTOR
G. H. Bowden
BY
Watson, Coit, Morse & Grindle
ATTORNEYS

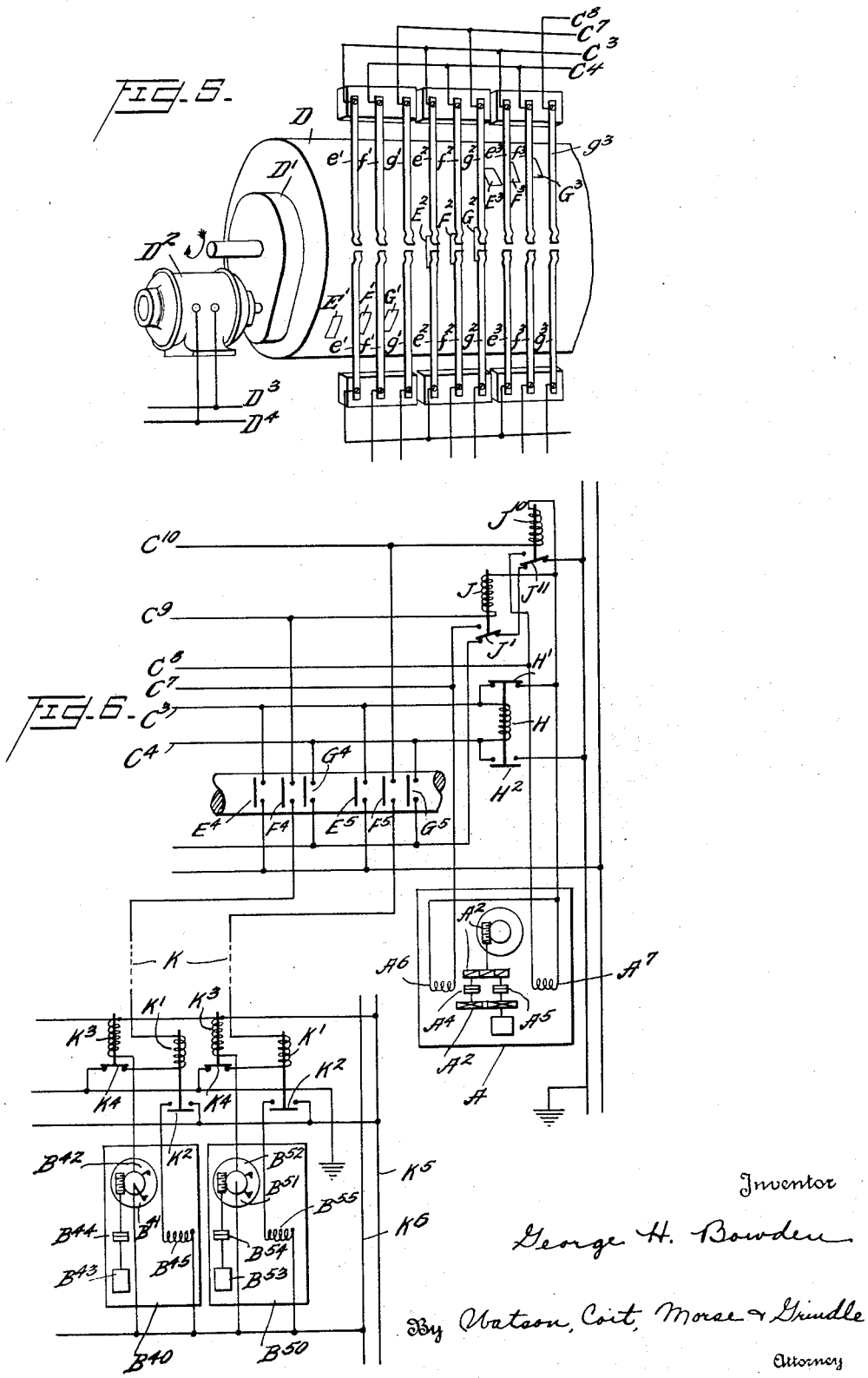

Patented Dec. 12, 1933

1,939,486

UNITED STATES PATENT OFFICE 1,939,486

APPARATUS FOR SUMMATING THE INTEGRATIONS OF ANY NUMBER OF INTEGRATING QUANTITY METERS

George Herbert Bowden, Coundon, Bishop Auckland, England, assignor to A. Reyrolle & Company, Limited, Hebburn-on-Tyne, England, a company of Great Britain Application June 6, 1930, Serial No. 459,476, and in Great Britain July 1, 1929

8 Claims. (Cl. 235—92)

This invention relates to the summation of the readings of a number of integrating quantity meters, such for example as those employed for the measurement of electrical energy or of the flow of gases or liquids or solids, and has for its object to provide improved totalizing apparatus for this purpose.

The totalizing apparatus according to the invention comprises a total reading indicator which is periodically associated with the individual meters through a selector device, and means whereby during each such association the indicator reading is advanced by an amount corresponding to the change in the selected meter reading since the previous association with such meter.

Each meter is preferably provided with two cooperating contact arms, of which the first is directly driven by the integrating mechanism of the meter and the second is driven by an A. C. synchronous motor or other constant speed driving element during each association of the meter with the indicator, the indicator pointer being driven by an A. C. synchronous motor or other constant speed driving element during such association until the two contact arms come into engagement. Conveniently the indicator pointer and the second contact arm on the selected meter are connected to their driving elements through electrically-controlled clutches, the operation of which is controlled by the selector device and by the two contact arms on the meter.

Means may be provided whereby the indicator pointer is driven in the reverse direction in order to decrease the total reading whenever the indicator is associated with a meter whose measurements are negative with respect to those of the other meters.

The arrangement according to the invention is applicable not only to the case of a group of meters located in the neighborhood of the indicator but also to the case of meters some or all of which are remote from the indicator. In the latter case the remote meters are associated with the indicator over one or more pilot circuits or other convenient channels of communication.

The invention may be carried into practice in various ways, but some convenient practical arrangements according thereto are illustrated by way of example in the accompanying drawings, in which Figure 1 shows an arrangement for totalizing the readings of a number of meters some of which are adjacent to the indicator whilst others are located at a remote station, Figure 2 shows a modified arrangement for the case of groups of meters located at remote stations, Figure 3 illustrates a convenient constructional form of the mechanism associated with the contact arms on each meter, Figure 4 illustrates a convenient indicator mechanism, Figure 5 is a perspective view of a convenient construction of the selector switch appearing in the previous figures, and Figure 6 shows an arrangement similar to Figure 2, but in which one of the remote meters is assumed to give negative readings.

In Figure 1 the upper portion shows the indicating station, which is provided with a total reading indicator A and a group of integrating meters B, of which three indicated respectively as $B^{10}$, $B^{20}$, $B^{30}$ are shown by way of example whilst the lower portion shows a remote station having another group of integrating meters indicated as $B^{40}$, $B^{50}$.

The total reading indicator A has a pointer $A^1$, which can be driven over its scale in one direction or the other through suitable gearing indicated at $A^2$ from a constant speed driving element $A^3$, which may consist, for example, of clockwork mechanism or of a synchronous A. C. motor supplied from mains not shown. The direction of drive of the pointer $A^1$ is controlled by two electromagnetic clutches $A^4$ $A^5$ respectively operated by a positive clutch coil $A^6$ and a negative clutch coil $A^7$.

The various integrating meters with their associated mechanisms are all similar to one another and are all designated by the reference letter B with index numerals, of which the tens digit indicates an individual meter while the units digit indicates the part of the meter. Thus the reference $B^{23}$ indicates the part $B^3$ of the second meter.

Each integrating meter B comprises the usual meter mechanism which is operated from the source to be measured and acts to drive a contact arm $B^1$, cooperating with a coaxially mounted second contact arm $B^2$ driven from a constant speed driving element $B^3$ through an electromagnetic clutch $B^4$ controlled by a clutch coil $B^5$. The driving elements $B^3$ may also consist of clockwork mechanisms all adjusted to drive at the same speed or of synchronous A. C. motors all supplied from the same A. C. system. The indicator driving element $A^3$ may be synchronized with the meter driving elements $B^3$, or may, if desired, operate at a different constant speed, the indicator scale being calibrated accordingly.

The various control circuits in the indicating station are supplied with power from control busbars C C$^1$, which are preferably connected to a D. C. source but may if desired be connected to an A. C. source. The circuits are controlled by a continuously driven selector switch which is shown somewhat diagrammatically in Figure 5. As seen in this figure, the selector comprises a drum D which is rotated at a constant speed through a gear box D$^1$ by a synchronous motor D$^2$ of the well known "Warren" type supplied from mains D$^3$, D$^4$.

Pairs of oppositely disposed contact blades $e^1$, $f^1$, $g^1$, $e^2$, $f^2$, $g^2$ ... cooperate with contact segments E$^1$, F$^1$, G$^1$, E$^2$, F$^2$, G$^2$, ... let into the drum surface. The three pairs of contact blades $e^1$, $f^1$, $g^1$ and the three contact segments E$^1$, F$^1$, G$^1$ together form a unit associated with the meter B$^{10}$ (Figure 1) and the relative disposition of the contacts E$^1$, F$^1$, G$^1$ is such that whilst the pairs of blades $e^1$, $f^1$, $g^1$ are in connection at the same time, contact between the blades $e^1$ is established slightly in advance of that between the blades $f^1$, which in turn is slightly before the contact between the blades $g^1$.

The contacts E$^1$ E$^2$ E$^3$ E$^4$ E$^5$ are all connected between two busbars C$^2$ C$^3$, of which the first C$^2$ is connected to the control busbar C, whilst the second C$^3$ is connected to one side of a cut-out relay H having two contacts H$^1$ H$^2$. The other side of the relay H is connected to a busbar C$^4$. In the case of meters B$^{10}$, B$^{20}$ and B$^{30}$ located in the indicating station, the busbar C$^4$ is connected through the associated selector contacts F$^1$ F$^2$ F$^3$ to the contact arms B$^{12}$ B$^{22}$ B$^{32}$ of the meters. In the case of meters B$^{40}$ and B$^{50}$ located at the remote station, the busbar C$^4$ is connected through the associated selector contacts G$^4$ G$^5$ to a busbar C$^5$ and thence to the control busbar C$^1$ through the change-over contact J$^1$ of an auxiliary relay J, when this contact is in its normal position.

The contact arm B$^{11}$ (or B$^{21}$ or B$^{31}$) and one side of the clutch coil B$^{15}$ (or B$^{25}$ or B$^{35}$) of each meter B located in the indicating station are connected through a busbar C$^6$ to the control busbar C$^1$. The other sides of the clutch coils B$^{15}$ B$^{25}$ B$^{35}$ of such meters are connected through the corresponding selector contacts G$^1$ G$^2$ G$^3$ to one or other of two busbars C$^7$ C$^8$, in accordance with whether the particular meter gives positive or negative measurements. By a meter giving negative measurements is meant a meter whose measurements should be subtracted from (instead of added to) the total registered on the indicator in order to give the desired result. For example, if it is desired that the total reading indicator show the total power actually generated at a station, the meters associated with the outgoing feeders will be treated as giving positive readings, whilst the readings of those associated with the incoming feeders, if any, will be regarded for the present purposes as negative. The busbar C$^7$ associated with meters such as B$^{10}$ B$^{20}$ giving positive measurements is connected to one side of the positive clutch coil A$^6$ of the indicator A and also through the change-over contact J$^1$ (when in its operated position) to the control busbar C$^1$. The busbar C$^8$ associated with meters such as B$^{30}$ giving negative measurements is connected to one side of the negative clutch coil A$^7$ of the indicator. The other sides of the two indicator clutch coils A$^6$ A$^7$ are connected together and through the normally closed contact H$^1$ of the relay H to the busbar C$^3$ and also to one side of the auxiliary relay J. The other side of the relay J is connected to a busbar C$^9$ and thence through the selector contacts F$^4$ F$^5$ associated with remote meters to pilot wires K leading to the remote station. One pilot wire K is provided for each remote meter, the control busbar C$^1$ being earthed to provide a common earth return circuit.

At the remote station each pilot wire K is connected to earth through a relay K$^1$ (having a contact K$^2$) and through the normally closed contact K of a relay K$^3$, a pair of relays K$^1$ K$^3$ being provided for each meter. The clutch coil B$^{45}$ or B$^{55}$ of each meter is connected between control busbars K$^5$ K$^6$ in the remote station through the corresponding normally open relay contact K$^2$. The contact arm B$^{41}$ or B$^{51}$ of each meter is connected to the control busbar K$^6$, and the contact arm B$^{42}$ or B$^{52}$ is connected through the corresponding relay K$^3$ to the control busbar K$^5$.

The operation of the system will now be described, the apparatus all being assumed to be in the normal rest position shown.

As the selector D reaches its first position it will close the contact E$^1$ and thereby connect one side of the cut-out relay H and one side of each indicator clutch coil A$^6$ or A$^7$ to the control busbar C. Immediately afterwards the contact F$^1$ will close to connect the other side of the cut-out relay H to the contact arm B$^{12}$ of the selected meter B$^{10}$, no operative circuit however being completed at this stage. This is in turn followed by the closing of contact G$^1$ which completes a circuit from the control busbar C through the busbar C$^2$, the selector contact E$^1$, the busbar C$^3$, the contact H$^1$, the indicator positive clutch coil A$^6$, the busbar C$^7$, the selector contact G$^1$, and the meter clutch coil B$^{15}$ to the control busbar C$^1$. The two clutch coils A$^6$ B$^{15}$ are thus energized and cause their clutches A$^4$ B$^{14}$ to engage. The meter contact arm B$^{12}$ and the indicator pointer A$^1$ are thus driven in synchronism until the contact arm B$^{12}$ reaches the contact arm B$^{11}$, whereby a circuit is completed from the control busbar C through the busbar C$^2$, the selector contact E$^1$, the busbar C$^3$, the cut-out relay H, the busbar C$^4$, the selector contact F$^1$, the meter contacts B$^{12}$ B$^{11}$, and the busbar C$^6$ to the control busbar C$^1$. Thus the cut-out relay H will be energized to open its contact H$^1$ and break the circuit to the two clutch coils. The contact arm B$^{12}$ and the indicator pointer A$^1$ are thus stopped, and the cut-out relay H makes its own retaining circuit at contact H$^2$ to prevent the reenergization of the clutch coils when the meter contact arm B$^{11}$ again moves away from the arm B$^{12}$, this retaining circuit being broken at contact E$^1$ when the selector D leaves the selected position. Thus the contact arm B$^{12}$ will be left in the reading position of the meter until the meter is again selected, and the indicator pointer A$^1$ has been advanced by an amount corresponding to the change in the meter reading since the last selection of such meter. It should be mentioned that if no change has taken place in the meter reading since its last selection, the two contact arms will already be in engagement and the cut-out relay H will be energized immediately the contact F$^1$ closes, thereby preventing any energization of the clutch coils A$^6$ B$^{15}$.

The selector D now moves on to the next position and in a similar manner causes the indicator pointer A$^1$ to be advanced by an amount corresponding to the change in the reading of the second meter $B^{20}$ since its last selection.

The third meter $B^{30}$ to be selected is shown as one giving measurements which are negative with respect to the measurements of the other meters. In this case the operation proceeds as before with the exception that the indicator negative clutch coil $A^7$ is energized in place of the positive clutch coil $A^6$. The effect of this is that the indicator pointer is driven in the reverse direction and the total reading is reduced by an amount corresponding to the change in the selected meter reading.

In the case of a remote meter, such as $B^{40}$ (or $B^{50}$), the selector first closes contact $E^4$ and prepares the circuit as before to the cut-out relay H and the indicator clutch coils $A^6$ $A^7$, and then closes contact $F^4$. This completes a circuit over the corresponding pilot wire K for the energization of the relays J and $K^1$, which operate to complete the circuits for the indicator positive clutch coil $A^6$ and for the selected meter clutch coil $B^{45}$. When the meter contact arms $B^{41}$ $B^{42}$ come into engagement, the relay $K^3$ is energized and acts at contact $K^4$ to break the circuit to the two relays J $K^1$, thereby deenergizing the clutch coils. The return of contact $J^1$ to its normal position completes the circuit through the selector contacts $E^4$ and $G^4$ (which have meanwhile closed) to the cut-out relay H which as before retains itself energized to prevent reenergization of the relays J and $K^1$ when the meter contact arm $B^{41}$ again moves forward away from the arm $B^{42}$.

The two remote meters $B^{40}$ $B^{50}$ shown in the drawings are both assumed to give positive measurements. In the case when there is a remote meter giving negative measurements, a second auxiliary relay similar to the relay J is provided to control the energization of the indicator negative clutch coil $A^7$.

In the arrangement of Figure 1 it is assumed that the readings of both the remote meters $B^{40}$ and $B^{50}$ are positive, that is to say it is desired that both be added to the total shown by the total reading indicator A. If, however, the reading of one of these remote meters is to be subtracted from the total, an arrangement such as that of Figure 6 may be employed. This figure corresponds to that part of Figure 1 which comprises the remote meters $B^{40}$ and $B^{50}$, the total reading indicator A, and the circuits associated therewith, with the exception that the circuit controlling the meter clutch coil $B^{55}$, whilst including the relay $K^1$ and selector contacts $F^5$ as before, does not include the relay J controlling the total reading indicator positive clutch coil $A^6$. Instead, the coil of an auxiliary relay $J^{10}$ is inserted in this circuit, the contact $J^{11}$ of this relay controlling the reverse clutch coil $A^7$ of the total reading indicator.

It will be appreciated that the operation of this arrangement will be similar to that of the arrangement of Figure 1, except that when the remote meter $B^{50}$ is selected the pointer of the total reading indicator will be moved backwards over a distance corresponding to the reading of this meter, which will thus be subtracted from the total.

The period of closing of the selector contacts in any one position must be made long enough to ensure completion of the movements of the indicator pointer and meter contact arm. It will also be appreciated that most of the heavier rotating parts of the apparatus will be continuously rotating, so that their inertia cannot give rise to errors.

Figure 2 shows a modification of the arrangement of Figure 1, to deal with the case of a number of meters located at each of a number of remote stations. The drawings for simplicity show only two meters at each of two remote stations without any meters at the indicating station, but it will be appreciated that the arrangement is capable of dealing with a relatively large number of meters at several stations. Many of the parts of this arrangement are identical with corresponding parts in the arrangement of Figure 1 and the same reference letters are employed where applicable. This figure also omits, for simplicity, any meters giving negative readings.

Thus the meters $B^{60}$ $B^{70}$ in the first remote station and the meters $B^{80}$ $B^{90}$ in the second remote station are all arranged in exactly the same manner as the meters in Figure 1. The total reading indicator designated $A^{10}$ is however simplified owing to the absence of negative reading meters, since it is unnecessary to provide the negative clutch coil $A^7$ and the associated parts, the indicator pointer $A^{11}$ being driven by the constant speed driving element $A^{13}$ through a single clutch $A^{14}$ operated by a clutch coil $A^{16}$. The relays H and J and the various busbars in the indicating station are also identical with those of Figure 1, except for the omission of the busbars $C^6$ $C^7$ $C^8$ and of the holding contact $H^2$ on the relay H which are no longer necessary in the absence of meters from the indicating station. The selector D is similar to that of Figure 1, the four groups of contacts respectively being indicated with the index numerals 6, 7, 8 and 9 applied to the letters E F G. The first two groups of contacts are associated with the two meters $B^{60}$ $B^{70}$ in the first remote station, and the contacts $F^6$ $F^7$ are connected to a busbar $C^{10}$ and thence to a single pilot wire L leading to that station. The next two groups of contacts are associated with the second remote station, and the contacts $F^8$ $F^9$ are connected to a busbar $C^{11}$ and thence to a single pilot wire M leading to the remote station. One pilot wire is provided for each remote station, the control busbar $C^1$ being earthed as before to provide an earth-return circuit.

At the first remote station the pilot wire L is connected to earth through a relay $L^1$ (having a normally open contact $L^2$) and through the normally closed contact $L^4$ of a relay $L^3$. A selector $D^1$ driven synchronously with the indicating station selector D operates groups of contacts $N^6$ $O^6$, $N^7$ $O^7$, which are associated respectively with the individual meters $B^{60}$ $B^{70}$ in the station and are operated in the appropriate order approximately simultaneously with the contacts $E^6$ $F^6$ $G^6$, $E^7$ $F^7$ $G^7$. The relay $L^3$ is connected between a control busbar $L^5$ and a busbar $L^7$, which is connected through the selector contacts $N^6$ $N^7$ respectively to the contact arms $B^{62}$ $B^{72}$ of the meters. The relay contact $L^2$ controls a connection from the control busbar $L^5$ to a busbar $L^8$, which is connected through the selector contacts $O^6$ $O^7$ respectively to the clutch coils $B^{65}$ $B^{75}$ of the meters. The other sides of the clutch coils $B^{65}$ $B^{75}$ and also the meter contact arms $B^{61}$ $B^{71}$ are connected to a busbar $L^9$ leading to the other control busbar $L^6$.

At the second remote station the pilot wire M is connected to earth through a relay $M^1$ (having a normally open contact $M^2$) and through the normally closed contact $M^4$ of a relay $M^3$. A selector $D^2$ driven synchronously with the selectors $D$ $D^1$ operates groups of contacts $P^8$ $Q^8$, $P^9$ $Q^9$ which are associated respectively with the individual meters in the station and are operated in the appropriate order approximately simultaneously with the contacts $E^8$ $F^8$ $G^8$, $E^9$ $F^9$ $G^9$. The relay $M^3$ is connected between a control busbar $M^5$ and a busbar $M^7$, which is connected through the selector contacts $P^8$ $P^9$ respectively to the contact arms $B^{82}$ $B^{92}$ of the meters. The relay contact $M^2$ controls a connection from the control busbar $M^5$ to a busbar $M^8$, which is connected through the selector contacts $Q^8$ $Q^9$ respectively to the clutch coils $B^{85}$ $B^{95}$ of the meters. The other sides of the clutch coils $B^{85}$ $B^{95}$ and also the meter contact arms $B^{81}$ $B^{91}$ are connected to a busbar $M^9$ leading to the other control busbar $M^6$.

The operation of this arrangement will be apparent from the description already given in connection with Figure 1 of the association of a remote meter with the indicator, the relays $L^1$ $L^3$ and $M^1$ $M^3$ corresponding to the relays $K^1$ $K^3$ of Figure 1, whilst the circuits controlled by these relays are also in the present case controlled by the selectors $D^1$ $D^2$.

Figure 3 shows somewhat diagrammatically a convenient practical construction of each meter and its associated mechanism. The constant speed driving element $B^3$ drives through gearing $R^1$ a shaft $R$ carrying a disc $R^2$. The contact arm $B^2$ is mounted on a sleeve $S$ surrounding the shaft $R$ and carrying a disc $S^1$ coacting with the disc $R^2$. The sleeve $S$ can slide on the shaft $R$ under the electromagnetic action of the clutch coil $B^5$ wound on a core $B^6$, so that when the coil is energized the two discs $R^2$ $S^1$ are brought into engagement, these discs together constituting the clutch $B^4$. The contact arm $B^1$ is connected through gearing $T^2$ to a shaft forming part of the integrating mechanism of the meter which is indicated at $T$ with its pointer $T^1$.

Figure 4 shows a corresponding arrangement for the indicator mechanism (this arrangement being shown by way of example for the case when only positive measurements are being dealt with, the reference letters used corresponding to those of the indicator $A^{10}$ of Figure 2). The constant speed driving element $A^{13}$, drives through suitable reduction gearing $A^{12}$ a shaft $U$ carrying a disc $U^1$. This disc $U^1$ together with a coacting disc $V^1$ mounted on a sleeve $V$ coaxial with the shaft $U$ constitutes the clutch $A^{14}$ and is electromagnetically controlled by the coil $A^{15}$. The indicator pointed $A^{11}$ is carried by the sleeve $V$.

It will be appreciated that the above arrangements have been given by way of example only and that they may be modified in a variety of ways within the scope of the invention. Thus for instance although pilot wires are used in the above arrangements for carrying current between the indicating and remote stations, high frequency currents superimposed on circuits existing for other purposes (or alternatively aerially radiated) may be substituted therefor.

What I claim as my invention and desire to secure by Letters Patent is:—

1. Totalizing apparatus for the readings of a number of integrating quantity meters, including in combination a total reading indicator, a selector device which acts periodically to associate the total reading indicator with the individual meters, two cooperating contact arms on each meter of which the first is directly driven by the integrating mechanism of the meter, and means for synchronously driving the indicator pointer and the second contact arm on a selected meter during each association of the indicator with such meter whereby the indicator reading is changed by an amount corresponding to the change in the selected meter reading since the previous association with such meter.

2. Totalizing apparatus for the readings of a number of integrating quantity meters, including in combination a total reading indicator, a selector device which acts periodically to associate the total reading indicator with the individual meters, two cooperating contact arms on each meter of which the first is directly driven by the integrating mechanism of the meter, a constant speed driving element for the second contact arm, a constant speed driving element for the indicator pointer, clutches controlling the connections of the driving elements to the indicator pointer and to the second contact arms on the meters, means whereby the selector device on selecting an individual meter causes the simultaneous engagement of the indicator clutch and the selected meter clutch, and means whereby such clutches are simultaneously disengaged when the two contact arms on the selected meter come into engagement with one another.

3. Totalizing apparatus for the readings of a number of integrating quantity meters, including in combination a total reading indicator, a selector device which acts periodically to associate the total reading indicator with the individual meters, two cooperating contact arms on each meter of which the first is directly driven by the integrating mechanism of the meter, a constant speed driving element for the second contact arm, a constant speed driving element for the indicator pointer, electromagnetically-operated clutches controlling the connections of the driving elements to the indicator pointer and to the second contact arms on the meters, means whereby the operating coils of the indicator clutch and of a selected meter clutch are energized in series to engage the clutches immediately the selector device brings the indicator into association with such meter, and a cut-out relay which is energized to break the series energizing circuit of such clutch coils to disengage the clutches immediately the two contact arms on the selected meter come into engagement with one another.

4. Totalizing apparatus for the readings of a number of integrating quantity meters some of which are located at a distance from the central station, including in combination a total reading indicator at the central station, a selector device at the central station which acts periodically to associate the total reading indicator with the individual meters, two cooperating contact arms on each meter of which the first is directly driven by the integrating mechanism of the meter, means for synchronously driving the indicator pointer and the second contact arm of a selected meter during each association of the indicator with such meter, a pilot circuit over which a selected remote meter is associated with the indicator, relays at the ends of such pilot circuit, means whereby the selector device on selecting such remote meter causes energization of the relays, means whereby the relays are deenergized when the two contact arms on the selected meter come into engagement, and means whereby the synchronous rotation of the indicator pointer and the second contact arm of the selected remote meter is started on energization of the relays and is stopped on deenergization thereof.

5. Totalizing apparatus for the readings of a number of integrating quantity meters some of which are located at a distance from the central station, including in combination a total reading indicator at the central station, a selector device at the central station which acts periodically to associate the total reading indicator with the individual meters, two cooperating contact arms on each meter of which the first is directly driven by the integrating mechanism of the meter, a constant speed driving element for the second contact arm, a constant speed driving element for the indicator pointer, electromagnetically-operated clutches controlling the connections of the driving elements to the indicator pointer and to the second contact arms on the meters, a pilot circuit over which a selected remote meter is associated with the indicator, relays at the ends of such pilot circuit, means whereby the relays are energized in series when the selector device brings the indicator into association with such remote meter, a cut-out relay which is energized to break the series energizing circuit of the relays immediately the two contact arms on the selected remote meter come into engagement with one another thereby de-energizing the relays, and means whereby the energization and the deenergization of the relays respectively cause the engagement and the disengagement of the indicator clutch and the selected remote meter clutch.

6. Totalizing apparatus for the readings of a number of integrating quantity meters some of which give measurements which are negative with respect to those of the other meters, including in combination a total reading indicator, a selector device which acts periodically to associate the total reading indicator with the individual meters, means whereby during each such association with a meter giving positive measurements the indicator pointer is rotated in the forward direction through an angle corresponding to the change in the selected meter reading since the previous association with such meter, and means whereby during each association with a meter giving negative measurements the indicator pointer is rotated in the reverse direction through an angle corresponding to the change in the selected meter reading since the previous association with such meter.

7. Totalizing apparatus for the readings of a number of integrating quantity meters some of which give measurements which are negative with respect to those of the other meters, including in combination a total reading indicator, a selector device which acts periodically to associate the total reading indicator with the individual meters, two cooperating contact arms on each meter of which the first is directly driven by the integrating mechanism of the meter, a constant speed driving element for the second contact arm, a clutch controlling the connection of such driving element to the second contact arm, a constant speed driving element for the indicator pointer, reversing gearing interposed between such driving element and the indicator pointer, two clutches controlling the reversing gearing and respectively operative in accordance with whether the selected meter gives positive or negative measurements, means whereby the selector device on selecting an individual meter causes the simultaneous engagement of the selected meter clutch and of the appropriate indicator clutch, and means whereby such clutches are simultaneously disengaged when the two contact arms of the selected meter come into engagement with one another.

8. For use in totalizing apparatus for the readings of a number of integrating quantity meters, an attachment for each meter comprising two coaxial contact arms, cooperating contacts on the said contact arms respectively, means for driving the first contact arm directly from the integrating mechanism of the meter, a constant speed driving element, and an electromagnetic clutch through which the second contact arm is driven by the driving element.

GEORGE HERBERT BOWDEN.